US011503190B2

United States Patent
Sakaguchi et al.

(10) Patent No.: US 11,503,190 B2
(45) Date of Patent: Nov. 15, 2022

(54) VIBRATION DEVICE AND OPTICAL DETECTION DEVICE

(71) Applicant: Murata Manufacturing Co., Ltd., Nagaokakyo (JP)

(72) Inventors: Hitoshi Sakaguchi, Nagaokakyo (JP); Katsumi Fujimoto, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 324 days.

(21) Appl. No.: 16/837,054

(22) Filed: Apr. 1, 2020

(65) Prior Publication Data

US 2020/0225466 A1 Jul. 16, 2020

Related U.S. Application Data

(63) Continuation of application No. PCT/JP2018/026355, filed on Jul. 12, 2018.

(30) Foreign Application Priority Data

Dec. 27, 2017 (JP) .............................. JP2017-250770

(51) Int. Cl.
*H04N 5/225* (2006.01)
*B08B 7/02* (2006.01)
(Continued)

(52) U.S. Cl.
CPC ....... *H04N 5/22521* (2018.08); *B06B 1/0207* (2013.01); *B06B 1/0651* (2013.01);
(Continued)

(58) Field of Classification Search
CPC ....... B06B 1/0207; B06B 1/0651; B06B 1/06; G02B 27/0006; B08B 7/02; B08B 7/04;
(Continued)

(56) References Cited

U.S. PATENT DOCUMENTS 8,009,979 B2 *  8/2011  Shirono ............ H04N 5/22521
                                                   396/535
10,401,618 B2 *  9/2019  Li ..................... H04N 5/2171
(Continued)

FOREIGN PATENT DOCUMENTS

JP           05-32191 U      4/1993
JP         2012-138768 A     7/2012
(Continued)

OTHER PUBLICATIONS

Wikipedia, Vibrations of a circular membrane, https://en.wikipedia.org/wiki/Vibrations_of_a_circular_membrane, This page was last edited on Apr. 23, 2021, at 18:53 (UTC)., 7 pages (Year: 2021).*
(Continued)

*Primary Examiner* — Clayton E. LaBalle
*Assistant Examiner* — Kevin C Butler
(74) *Attorney, Agent, or Firm* — Keating & Bennett, LLP

(57) ABSTRACT

A vibration device includes a light-transmissive body defining a cover that includes a detection region of an imaging element as an optical detection element, a tubular support body which includes an interior space that includes the imaging element and is connected to the light-transmissive body, a vibrating body which is coupled to the support body and vibrates the light-transmissive body with the support body provided therebetween, and a drive circuit which drives the vibrating body.

26 Claims, 14 Drawing Sheets

(51) Int. Cl.
*B06B 1/02* (2006.01)
*B06B 1/06* (2006.01)
*G02B 27/00* (2006.01)
*G03B 17/02* (2021.01)
*B08B 7/04* (2006.01)
*G03B 17/00* (2021.01)

(52) U.S. Cl.
CPC .................. *B08B 7/02* (2013.01); *B08B 7/04* (2013.01); *G02B 27/0006* (2013.01); *G03B 17/00* (2013.01); *G03B 17/02* (2013.01); *B06B 2201/77* (2013.01)

(58) Field of Classification Search
CPC ................ H04N 5/22521; G03B 17/08; G03B 2205/0061; G03B 17/02; G03B 17/00
USPC .......................................................... 359/507
See application file for complete search history.

(56) References Cited

U.S. PATENT DOCUMENTS

| | | | | |
|---|---|---|---|---|
| 10,591,720 | B2* | 3/2020 | Fedigan | G02B 27/0006 |
| 10,695,805 | B2* | 6/2020 | Magee | B60S 1/56 |
| 11,012,597 | B2* | 5/2021 | Fujimoto | H04N 5/22521 |
| 11,237,387 | B2* | 2/2022 | Magee | G02B 27/0006 |
| 2010/0060760 | A1* | 3/2010 | Sakurai | H04N 5/232122 15/94 |
| 2012/0243093 | A1* | 9/2012 | Tonar | G02B 27/0006 359/507 |
| 2018/0095272 | A1 | 4/2018 | Fujimoto et al. | |
| 2018/0210194 | A1 | 7/2018 | Nishiyama et al. | |
| 2018/0292646 | A1 | 10/2018 | Fujimoto et al. | |
| 2020/0213495 | A1* | 7/2020 | Fujimoto | B06B 1/0207 |
| 2020/0225466 | A1* | 7/2020 | Sakaguchi | H04N 5/2253 |
| 2021/0302723 | A1* | 9/2021 | Fujimoto | B08B 7/02 |
| 2021/0320241 | A1* | 10/2021 | Kitamori | H01L 41/0926 |

FOREIGN PATENT DOCUMENTS

| | | | | |
|---|---|---|---|---|
| JP | 2017-170303 | A | | 9/2017 |
| WO | 2017/022382 | A1 | | 2/2017 |
| WO | 2017/110564 | A1 | | 6/2017 |
| WO | 2017/149933 | A1 | | 9/2017 |
| WO | WO-2018198417 | A1 | * | 11/2018 .......... B06B 1/0625 |
| WO | WO-2019130623 | A1 | * | 7/2019 .......... B06B 1/0207 |
| WO | WO-2019130629 | A1 | * | 7/2019 .......... B06B 1/0651 |
| WO | WO-2020003572 | A1 | * | 1/2020 .......... G02B 27/0006 |
| WO | WO-2021111668 | A1 | * | 6/2021 .......... G03B 11/04 |
| WO | WO-2021192387 | A1 | * | 9/2021 .......... B06B 1/0207 |

OTHER PUBLICATIONS

International Search Report, Vibration and Optical Detection Device, PCT/JP2018/026355, dated Oct. 16, 2018, 1 page (Year: 2018).*
Written Opinion Of the International Search Authority, Vibration and Optical Detection Device, PCT/JP2018/026355, dated Oct. 16, 2018, 5 pages (Year: 2018).*
Official Communication issued in International Patent Application No. PCT/JP2018/026355, dated Oct. 16, 2018.

* cited by examiner

VIBRATION DEVICE AND OPTICAL DETECTION DEVICE

CROSS REFERENCE TO RELATED APPLICATIONS

This application claims the benefit of priority to Japanese Patent Application No. 2017-250770 filed on Dec. 27, 2017 and is a Continuation Application of PCT Application No. PCT/JP2018/026355 filed on Jul. 12, 2018. The entire contents of each application are hereby incorporated herein by reference.

BACKGROUND OF THE INVENTION

1. Field of the Invention

The present invention relates to a vibration device that removes foreign matters, for example, water droplets, dust, or the like adhering to a dome-shaped cover, and an optical detection device including the vibration device.

2. Description of the Related Art

There have been proposed various camera modules in which a light-transmissive body is arranged in front of an imaging element of a camera. In Japanese Unexamined Utility Model Registration Application Publication No. 05-032191, a tubular hood is arranged in front of a camera. A piezoelectric vibrator is fixed to the hood. Water droplets adhering to an outer surface of the hood are atomized and removed by vibration of the piezoelectric vibrator.

Japanese Unexamined Patent Application Publication No. 2017-170303 discloses a dome-shaped light-transmissive body arranged in front of a camera. The dome-shaped light-transmissive body is provided with a flange portion extending outward in a radial direction. A ring-shaped piezoelectric vibrator is fixed to the flange portion. The dome-shaped light-transmissive body is vibrated by vibration of the piezoelectric vibrator. Droplets are thereby removed.

In Japanese Unexamined Utility Model Registration Application Publication No. 05-032191 and Japanese Unexamined Patent Application Publication No. 2017-170303, the water droplets or the like are removed by using the vibration of the piezoelectric vibrator. Incidentally, in Japanese Unexamined Utility Model Registration Application Publication No. 05-032191, the tubular hood is vibrated. Therefore, there was no vibration node in a field of view of the camera.

In contrast, in Japanese Unexamined Patent Application Publication No. 2017-170303, when a dome-shaped light-transmissive body is vibrated, it was not possible to prevent a node of vibration from being generated within the field of view of the camera. At the node of the vibration, displacement is very small. Therefore, attached water droplets or the like cannot be reliably removed.

SUMMARY OF THE INVENTION

Preferred embodiments of the present invention provide vibration devices and optical detection devices each including a vibration device that are able to reliably remove water droplets or dust adhering to a surface of a dome-shaped cover.

A first vibration device according to a preferred embodiment of the present invention includes a dome-shaped cover that includes a detection region of an optical detection element, a tubular support body including an interior space in which the optical detection element is provided, the tubular support body being connected to the cover, a vibrating body coupled to the support body and vibrating the cover with the support body interposed between the vibrating body and the cover, and a drive circuit, in a case where the cover and the support body are vibrated at the same of substantially the same resonant frequency, in a connection portion where the cover and the support body are connected, the drive circuit driving the vibrating body at the same or substantially the same frequency as the resonant frequency to vibrate the cover and the support body in a vibration mode in which displacement of a portion on a connection portion side of the cover and displacement of a portion on a connection portion side of the support body are in opposite or substantially opposite directions.

A second vibration device according to a preferred embodiment of the present invention includes a dome-shaped cover that includes a detection region of an optical detection element, a tubular support body including an interior space in which the optical detection element is provided, the tubular support body being connected to the cover, a vibrating body coupled to the support body and vibrating the cover with the support body interposed between the vibrating body and the cover, and a drive circuit, in a case where the cover and the support body are vibrated at the same or substantially the same resonant frequency, the drive circuit driving the vibrating body at the same or substantially the same frequency as the resonant frequency of the support body and the cover, and a node region is located at a connection portion where the cover and the support body are connected to each other.

Hereinafter, the first vibration device and the second vibration device will be collectively referred to as a vibration device according to a preferred embodiment of the present invention.

An optical detection device according to a preferred embodiment of the present invention includes a vibration device according to a preferred embodiment of the present invention, and an optical detection element provided in at least a portion of an interior space of the support body of the vibration device and having the detection region on the cover.

According to vibration devices and optical detection devices of preferred embodiments of the present invention, a dome-shaped cover is included, but in a case where the dome-shaped cover is vibrated by a vibrating body, water droplets, dust, or the like adhering to a dome-shaped cover surface are able to be reliably removed.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of the present invention will now be described with reference to the drawings to clarify the present invention.

It should be noted that each of the preferred embodiments described herein is illustrative and that partial substitutions or combinations of configurations are possible between different preferred embodiments.

Figure 1:
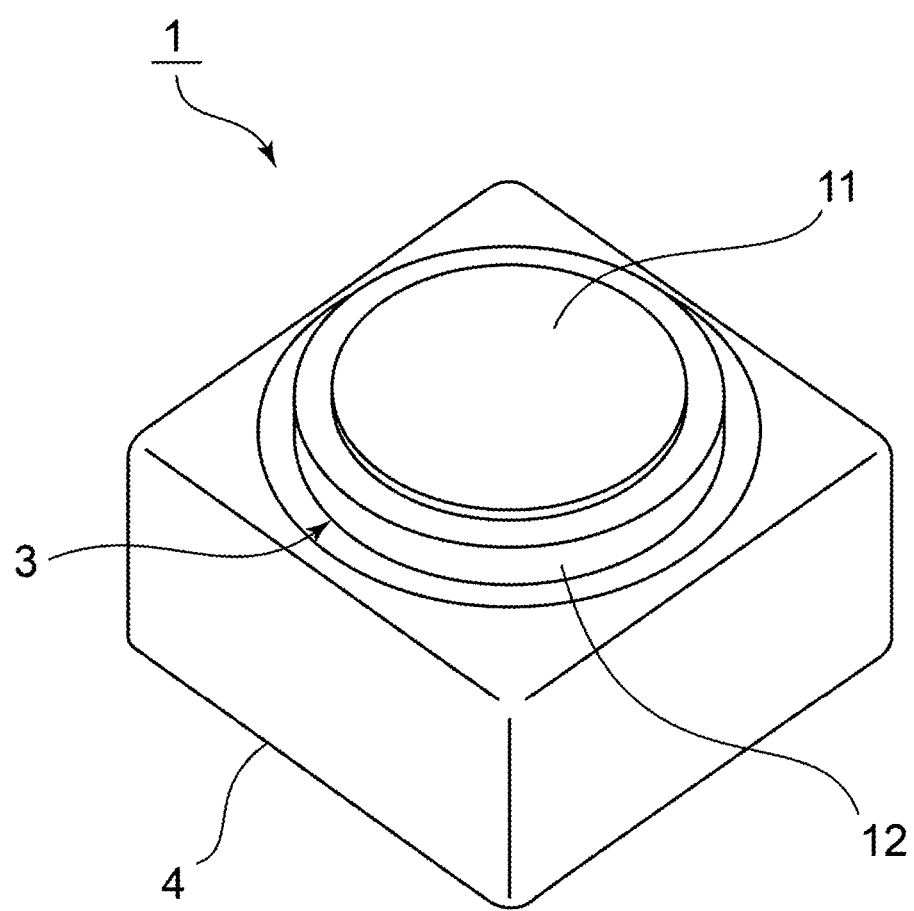
FIG. 1 is a perspective view showing an appearance of a camera module according to a first preferred embodiment of the present invention.
Figure 2:
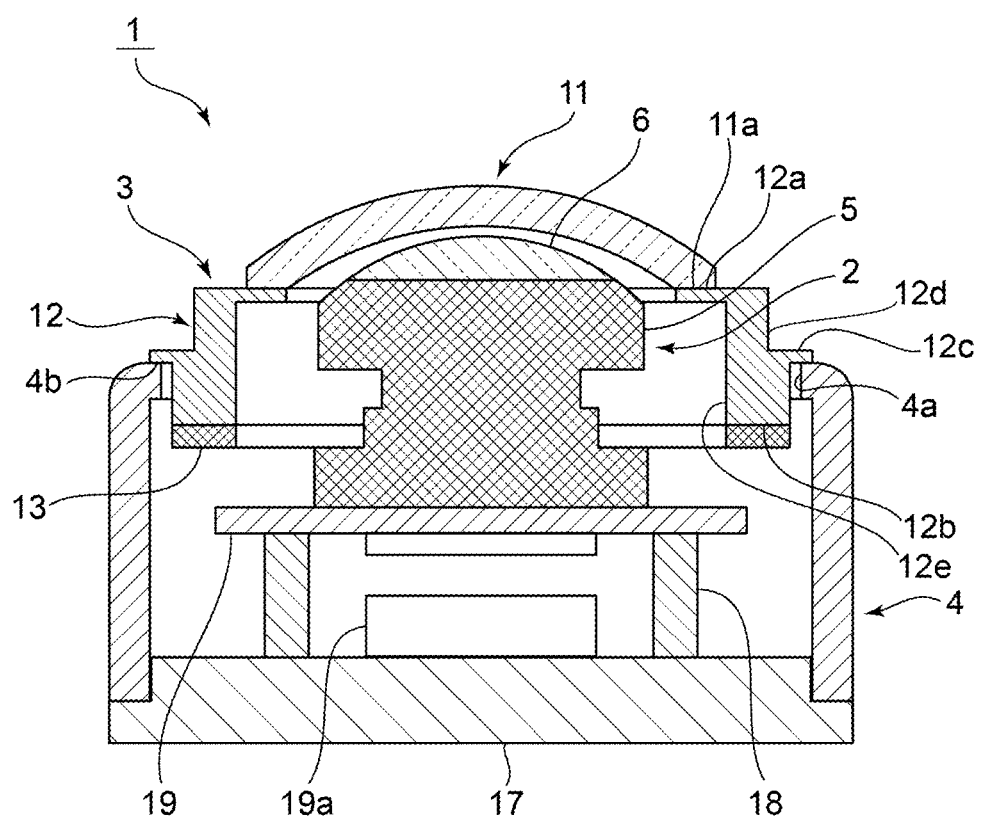
FIG. 2 is a front cross-sectional view of the camera module according to the first preferred embodiment of the present invention.
Figure 3:
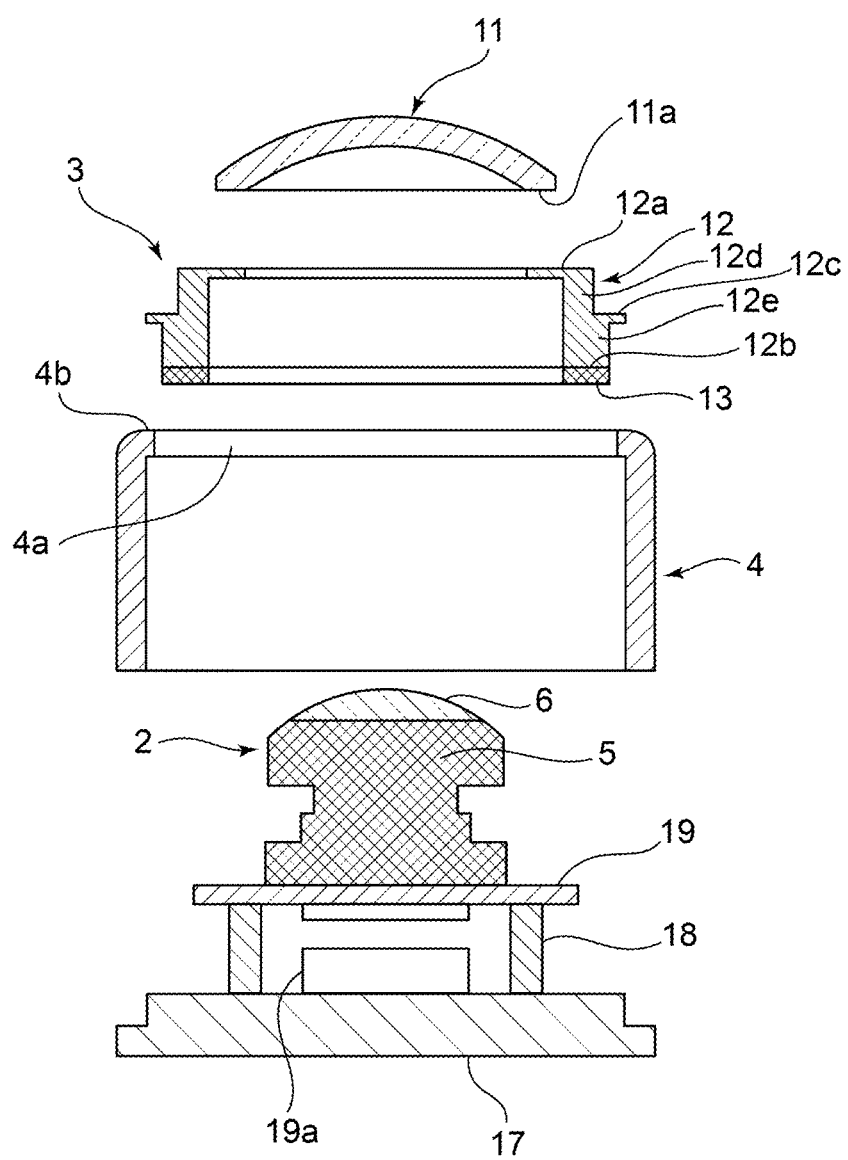
FIG. 3 is an exploded front cross-sectional view of the camera module according to the first preferred embodiment of the present invention.

FIG. 1 is a perspective view showing an appearance of an optical detection device according to a first preferred embodiment of the present invention, FIG. 2 is a front cross-sectional view thereof, and FIG. 3 is an exploded front cross-sectional view.

A camera module 1 defining an optical detection device includes a camera module main body 2, a vibration device 3, and a case 4.

The camera module main body 2 includes an imaging element 5 and a lens module 6 defining an optical detection element. The vibration device 3 includes a light-transmissive body 11 including a dome-shaped cover, a tubular support body 12, and a vibrating body 13. The imaging element 5 of the camera module main body 2 takes an image of an outside of the light-transmissive body 11. Therefore, in the first preferred embodiment, the imaging element 5 defining an optical detection element detects visible light as an active energy ray, and takes an image within a field of view as a detection region. The field of view, which is a detection region of the imaging element 5, is located in the light-transmissive body 11. That is, the light-transmissive body 11 has a size including the field of view.

The light-transmissive body 11 is made of a transparent material. Such a material is not particularly limited, and various kinds of glass, for example, soda glass, quartz glass, borosilicate glass and the like, and synthetic resin can preferably be used.

In the first preferred embodiment, the light-transmissive body 11 has a shape provided by cutting a portion of a sphere at a position that is not a maximum outer peripheral portion of the sphere. However, the light-transmissive body 11 may have various curved shapes that project toward an object side, that is, toward the outside. That is, an outer surface of the light-transmissive body 11 is not limited to a portion of a spherical surface. In addition, in the preferred embodiments of the present invention, the shape of a "dome shape" is intended to include even a shape in which planes of a plurality of polygonal shapes or the like are gathered together to have a resulting dome shape, as well as a shape defined by only a curved surface. Furthermore, an end surface on a dome-shaped support body 12 side is not limited to an annular shape, and may have a shape in which a portion of the annular shape falls off, or may be an angular-annular shape.

A ring-shaped end surface 11a located adjacent to or in a vicinity of an outer peripheral edge of the light-transmissive body 11 is joined to a ring-shaped first end surface 12a of the support body 12. The support body 12 is a cylindrical or substantially cylindrical member and includes the first end surface 12a and a second end surface 12b on the opposite side. A vibrating body 13 including a piezoelectric element is joined to a second end surface 12b of the support body 12.

The support body 12 includes a fixing flange portion 12c projecting outward. The fixing flange portion 12c is provided at a position between the first end surface 12a and the second end surface 12b.

By vibrating the vibrating body 13, together with the vibrating body 13, the light-transmissive body 11 is vibrated with the support body 12 interposed therebetween. As a result, as will be described later, water droplets, dust, or the like, for example, adhering to the outer surface of the light-transmissive body 11 are able to be removed.

Figure 4:
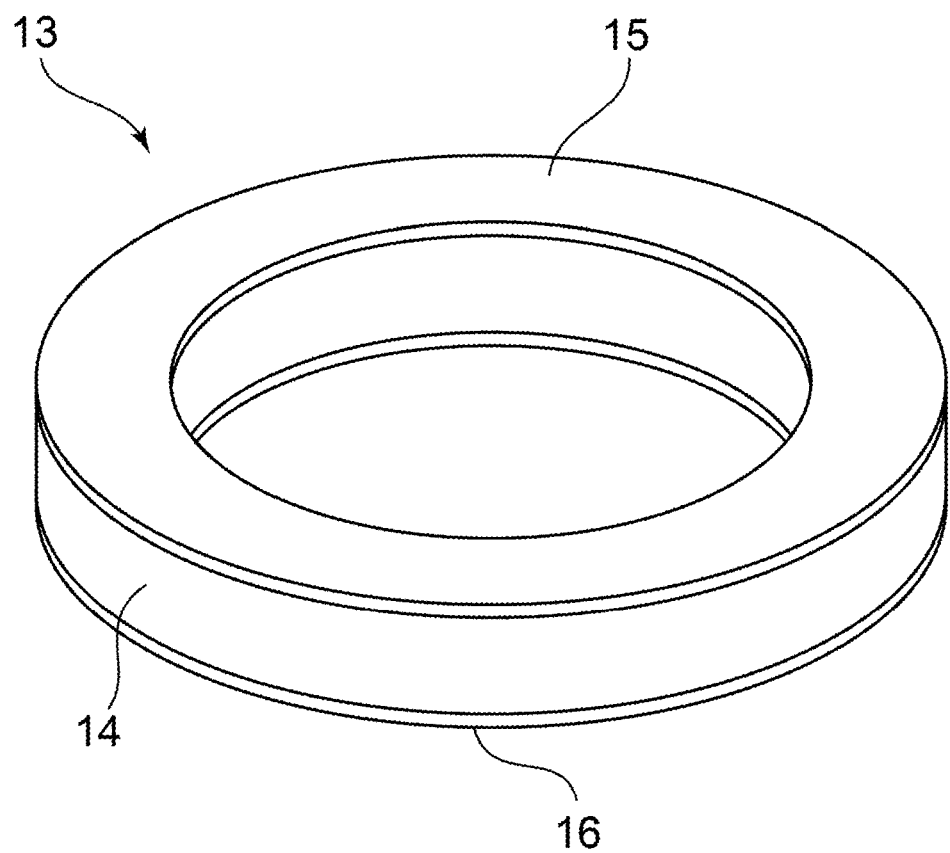
FIG. 4 is a perspective view showing a piezoelectric element as a vibrating body included in the first preferred embodiment of the present invention.

The support body 12 may be made of various metal materials, for example, stainless steel, kovar, invar, alloy thereof, or the like, or ceramics, for example, alumina, and the material thereof is not particularly limited. As shown in FIG. 4, the vibrating body 13 includes a ring-shaped piezoelectric body 14, a first excitation electrode 15 provided on one surface of the piezoelectric body 14, and a second excitation electrode 16 provided on another surface. The piezoelectric body 14 is subjected to poling treatment in a thickness direction. A piezoelectric material of the piezoelectric body 14 is also not particularly limited, and a SrBaTi-based piezoelectric material, a TiBaO-based piezoelectric material, a PbTiO-based piezoelectric material, or the like, for example, can be used.

The first and second excitation electrodes 15 and 16 are made of an appropriate metal material, for example, Al, Cu, Ag, Au, an alloy thereof, or the like.

As shown in FIG. 1 to FIG. 3, the case 4 includes an opening 4a that opens upward. A ring-shaped end surface 4b surrounds the opening 4a. A fixing flange portion 12c of the support body 12 of the vibration device 3 is joined to the ring-shaped end surface 4b. Thus, the vibration device 3 is fixed to the case 4. As shown in FIG. 2, a portion on a lens module side of the camera module main body 2 is located in an interior space of the vibration device 3, and the remaining portion thereof is located in an interior space of the case 4. The entire or substantially the entire camera module main body 2 may be located in an interior space of the support body 12. That is, it is sufficient that at least a portion of the camera module main body 2 may be located in the interior space of the support body 12.

The case 4 may be made of a suitable material, for example, metal, synthetic resin, ceramics, or the like.

Further, the case 4 is fixed to a base plate 17. A plurality of leg portions 18 are fixed on the base plate 17. A substrate 19 is fixed on the plurality of leg portions 18. The camera module main body 2 is fixed on the substrate 19.

A drive circuit 19a that drives the vibrating body 13 made of a piezoelectric element and a drive circuit that drives the camera module main body 2 are provided on at least one main surface of the substrate 19 or on a top surface of the base plate 17. The drive circuit 19a may be defined by a suitable electric circuit that is able to drive the vibrating body 13 at a specific frequency.

The drive circuit 19a vibrates the vibrating body 13 to vibrate the light-transmissive body 11 with the support body 12 interposed therebetween. In this case, when the light-transmissive body 11 defining the cover and the support body 12 vibrate at the same or substantially the same resonant frequency, in a connection portion described later in which the light-transmissive body 11 and the support body 12 are connected to each other, the drive circuit drives the vibrating body 13 at the same or substantially the same frequency as the resonant frequency, and the light-transmissive body 11 and the support body 12 are vibrated in a vibration mode in which displacement of a portion on a connection portion side of the light-transmissive body 11 and displacement of a portion on a connection portion side of the support body 12 are in opposite or substantially opposite directions.

Alternatively, the drive circuit 19a drives the vibrating body 13 at the same or substantially the same frequency as the resonant frequency of the light-transmissive body 11 and the support body 12, and a node region is located at the connection portion connecting the light-transmissive body 11 and the support body 12.

The base plate 17, the leg portion 18, and the substrate 19 are also made of a suitable material, for example, synthetic resin, metal, or the like.

The feature of the first preferred embodiment is that in the vibration device 3, in the connection portion connecting the light-transmissive body 11 and the tubular support body 12, the vibrating body 13 is driven by the drive circuit 19a at the same or substantially the same frequency as the above-described resonant frequency, and the light-transmissive body 11 and the support body 12 are vibrated in the vibration mode in which the displacement of the portion on the connection portion side of the light-transmissive body 11 and the displacement of the portion on the connection portion side of the support body 12 are in the opposite or substantially opposite directions.

Alternatively, as described above, the vibrating body 13 is driven by the drive circuit 19a at the same or substantially the same frequency as the resonant frequency of the light-transmissive body 11 and the support body 12 so that the node region is located at the connection portion.

Therefore, in a case where the vibrating body 13 including a piezoelectric vibrator is vibrated, the light-transmissive body 11 vibrates with the support body 12 interposed therebetween, but there is no portion where displacement directions on both sides are opposed to each other on a surface of the light-transmissive body 11, and the node region is located at the connection portion, therefore, a node is not present on the outer surface of the light-transmissive body 11. Therefore, the attached water droplets and dust, for example, are able to be reliably removed. Preferably, at the connection portion, a displacement amount of the light-transmissive body 11 and a displacement amount of the support body 12 are the same or substantially the same, for example.

Note that the same or substantially the same is not necessarily intended to be absolutely the same, and not only a case where they are completely the same but also a case where the displacement amount of the support body 12 is within the displacement amount about +40 to about −70% of the light-transmissive body 11. Within this range, water droplets and dust, for example, adhering to the outer surface of the light-transmissive body 11 are able to be removed more reliably.

Preferably, the resonant frequency of the light-transmissive body 11 is the same or substantially the same as the resonant frequency of the support body 12 to which the vibrating body 13 is coupled, for example. In this case as well, the light-transmissive body 11 is able to be strongly vibrated. Therefore, water droplets and dust, for example, adhering to the outer surface of the light-transmissive body 11 are able to be reliably removed. Here, the fact that "the resonant frequencies are the same or substantially the same" means not only a case where the resonant frequencies are completely the same but also a case of the range in which the resonant frequency of the support body 12 is within about ±10% resonant frequency of the light-transmissive body 11.

A preferred ratio between the resonant frequency of the light-transmissive body 11 and the resonant frequency of the support body 12 will be described in more detail later with reference to FIG. 8 and FIG. 9.

The connection portion between the light-transmissive body 11 and the support body 12 is not limited to a joint surface between the two, but is referred to as a portion on the support body 12 side which includes a boundary between the two. The range of the connection portion is referred to as a portion from the first end surface 12a of the support body 12 to a midpoint between the first end surface 12a and the second end surface 12b. That is, it is sufficient that the node region of the vibration is located in this portion. In this case, a portion of the first end surface 12a side of the support body 12, that is, a portion closer to the first end surface 12a side than the node becomes a portion displaced in the displacement direction of the light-transmissive body 11, and a portion lower than the node becomes a portion that is able to be displaced in a direction opposite or substantially opposite to the displacement direction of the light-transmissive body 11. That is, the support body 12 includes a cancellation portion where a portion displaced in the displacement direction of the transmissive body 11 and a portion displaced in the opposite or substantially opposite direction to the displacement direction of the light-transmissive body 11 are adjacent to each other. In the first preferred embodiment, the node is preferably the cancellation portion. Accordingly, it is sufficient that the cancellation portion may be present in the connection portion, and the cancellation portion is not limited to an interface between the light-transmissive body 11 and the support body 12.

When the node region is located in the support body 12 as described above, displacement of the node region on one side and displacement on the opposite side are in opposite or substantially opposite directions. Accordingly, the node region defines the cancellation portion.

The node region includes not only a node but also a region adjacent to or in a vicinity of the node. In the light-transmissive body 11, the node may be located in the support body 12 as described above, as long as there is no cancellation portion adjacent to the displacement portion in the opposite or substantially opposite direction.

In the tubular support body 12, an outer diameter of a second portion 12e below the fixing flange portion 12c is larger than an outer diameter of a first portion 12d from the first end surface 12a side to the fixing flange portion 12c. In other words, the second portion 12e projects outward to define the flange portion.

Accordingly, the flange portion projecting outward may be provided on the support body 12 separately from the fixing flange portion 12c.

Figure 5A:
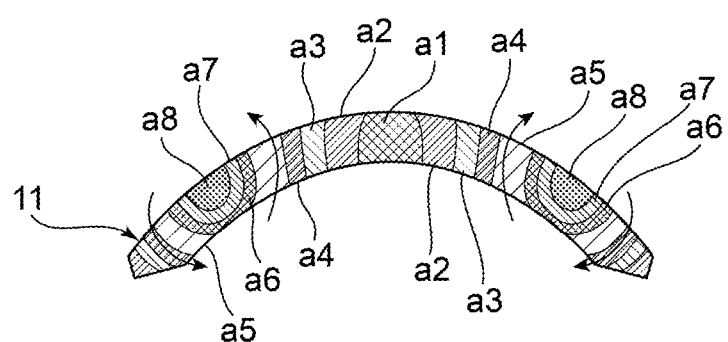
FIG. 5A is a cross-sectional view showing displacement distribution in a case where a dome-shaped cover is vibrated alone.
Figure 5B:
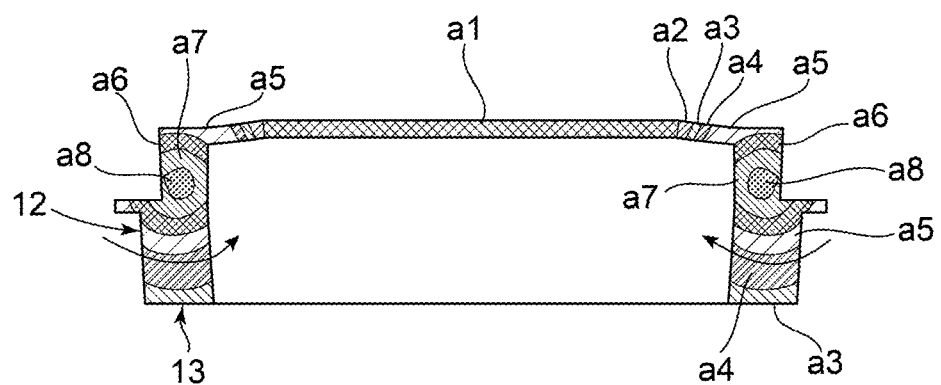
FIG. 5B is a cross-sectional view showing displacement distribution of a structure in which a support body and a vibrating body are coupled to each other.

FIG. 5A is a cross-sectional view showing displacement distribution in a case where the above-described light-transmissive body 11 is vibrated alone, and FIG. 5B is a cross-sectional view showing displacement distribution of a structure in which the support body 12 and the vibrating body 13 are coupled to each other.

In FIGS. 5A and 5B, a region a1 marked with cross-hatching indicates the largest displacement, and regions a2, a3, a4, a5, a6, and a7 respectively have smaller displacement in this order. A region a8 indicated by dot hatching has the smallest displacement, and corresponds to a node.

As shown in FIG. 5A, when the light-transmissive body 11 is vibrated and displaced in the direction indicated by arrows, the node of the vibration appears in a ring shape in the light-transmissive body 11. Therefore, in such a vibration mode, it is not possible to effectively remove water droplets or dust, for example, adhering to the node.

As shown in FIG. 5B, when the vibrating body is bent and vibrated, the tubular support body 12 vibrates in a respiration mode. That is, the displacement in a direction in which the outer diameter increases and the displacement in a direction in which the outer diameter decreases are repeated. Therefore, the most displaced portion is the region a1. The displacement of the arrow in the region a1 is applied to the light-transmissive body 11.

Figure 6:
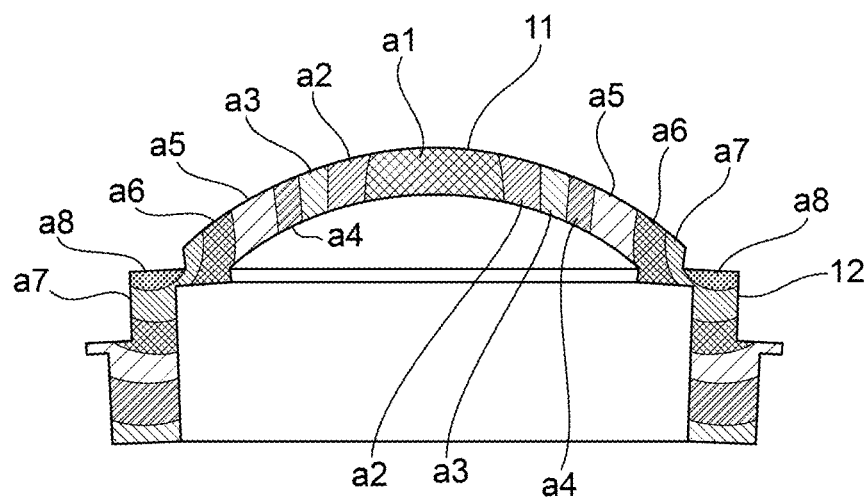
FIG. 6 is a cross-sectional view showing displacement distribution in a vibration state of a vibration device according to the first preferred embodiment of the present invention.
Figure 7:
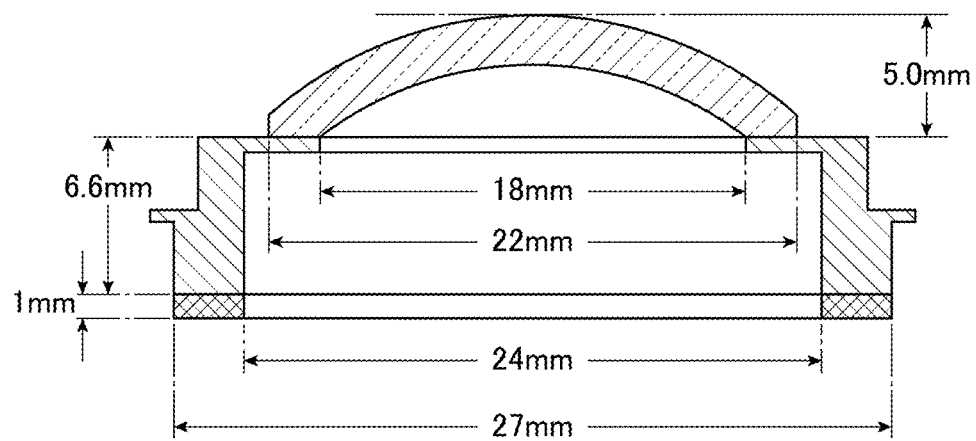
FIG. 7 is a elevational cross-sectional view for explaining a model of a simulation in which the displacement distribution shown in FIG. 6 is provided.

FIG. 6 is a cross-sectional view showing displacement distribution of each portion in a case where the vibrating body 13 is vibrated in a structure in which the light-transmissive body 11 is connected to the support body 12 and integrated, as in the first preferred embodiment. Note that a simulation model and conditions for which the displacement distribution is provided are as follows. Dimensions of respective portions were set to values shown in FIG. 7. A material of the light-transmissive body 11 was quartz glass. A material of the support body 12 was stainless steel (SUS304). The piezoelectric element of the vibrating body 13 was set to have a structure in which electrodes are provided on both surfaces of a ring-shaped member made of PZT. It is assumed that the piezoelectric element was polarized in the thickness direction. Further, the resonance was analyzed under a condition in which a potential difference of about 1 V was applied to front and back surfaces of the piezoelectric element.

As shown in FIG. 6, the region a1 is the largest displacement portion. That is, the center or approximate center of the light-transmissive body 11 is displaced the most. In contrast, the region a8 having the smallest displacement which becomes the node of the vibration is located on the support body 12 side from a joint interface between the two. This is because, in a case where the light-transmissive body 11 and the support body 12 are vibrated at the same or substantially the same resonant frequency, the connection portion having a structure in which the light-transmissive body 11 and the support body 12 are connected to each other is vibrated in the vibration mode in which the displacement of a portion on the connection portion side of the light-transmissive body 11 and the displacement of a portion on the connection portion side of the support body 12 are in the opposite or substantially opposite directions. The vibration is able to be provided by setting the frequency at which the vibrating body 13 is driven by the drive circuit 19a to the same or substantially the same frequency as the above-described resonant frequency in the structure in which the above-described light-transmissive body 11 and the support body 12 are connected to each other.

Therefore, the region a8 defining and functioning as a node of the vibration is not located within the light-transmissive body 11. That is, the node of the vibration does not appear within the field of view of the imaging element 5 of the camera module main body 2 shown in FIG. 2. Therefore, water droplets, dust, or the like, for example, adhering to the outer surface of the portion corresponding to the field of view of the light-transmissive body 11 are able to be reliably removed.

As described above in the first preferred embodiment, in the structure in which the light-transmissive body 11 and the support body 12 are connected to each other, in order to set the position of the node of the vibration as described above, the resonant frequency of the light-transmissive body 11 and the resonant frequency of the support body 12 are the same or substantially the same, and thus driving the vibrating body 13 at the same or substantially the same frequency as the above-described resonant frequency, the advantageous effects of the preferred embodiments of the present invention are able to be obtained. This will be described with reference to FIG. 8 to FIG. 12.

Figure 8:
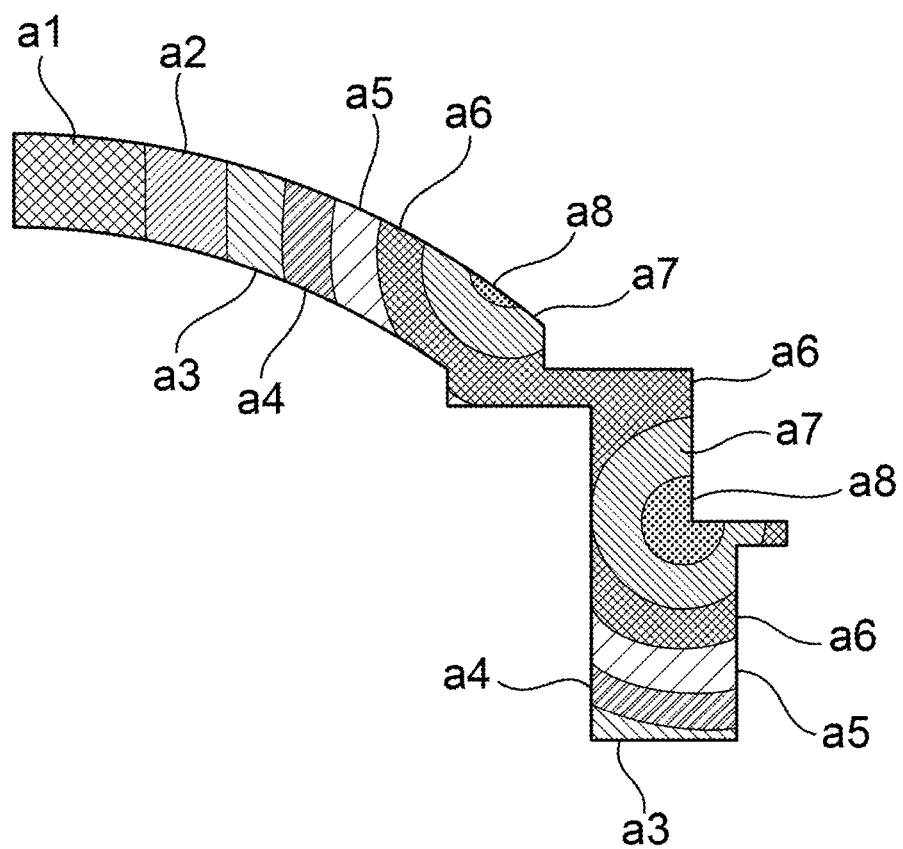
FIG. 8 is a cross-sectional view showing displacement distribution in a case where a resonant frequency of a light-transmissive body is the same or substantially the same as a resonant frequency of the support body, and therefore a resonant frequency ratio is about 1.0.

FIG. 8 is a diagram showing displacement distribution in a case where the resonant frequency of the light-transmissive body 11 is the same or substantially the same as the resonant frequency of the support body 12. Here, a ratio of the resonant frequency of the support body 12 with respect to the resonant frequency of the light-transmissive body 11 is defined as a resonant frequency ratio. In FIG. 8, the displacement distribution in a case where the resonant frequency ratio is about 1.0 is shown. On the other hand, FIG. 9 shows the displacement distribution in a case where the above-described resonant frequency ratio is about 1.2.

Figure 9:
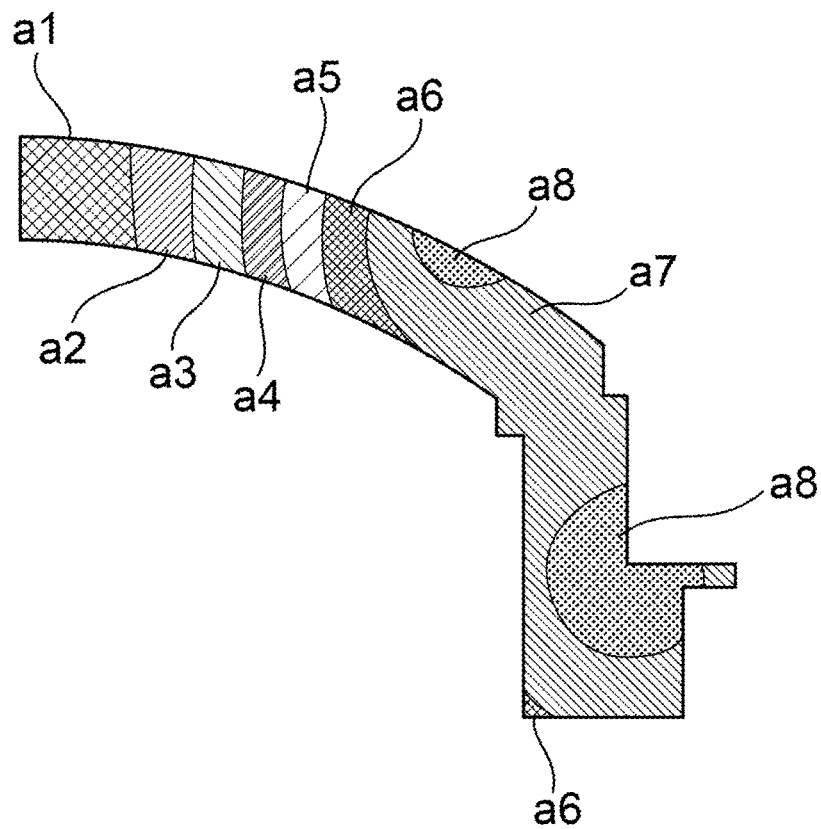
FIG. 9 is a cross-sectional view showing displacement distribution in a case where the resonant frequency ratio is about 1.2.

Simulation conditions for the displacement distributions shown in FIG. 8 and FIG. 9 were the same as those in the case where the displacement distribution shown in FIG. 6 was provided.

Note that FIG. 8 and FIG. 9 show the displacement distribution of the cross-sectional portion cut into half along the center or substantially the center as a symmetry of a structure in which the light-transmissive body 11 and the support body 12 are connected to each other. As in the case of FIGS. 5A and 5B, regions having different magnitudes of displacement are hatched and distinguished. The region a1 indicates a portion where the displacement is largest, and the displacement becomes smaller in the order of the regions a2, a3, a4, a5, a6, a7, and a8.

In the displacement distribution shown in FIG. 8, the region a8 which is the node region is located at a periphery of the light-transmissive body 11. In FIG. 9, the region a8 which is the node region is located at the center side of the light-transmissive body 11.

A viewing angle in a case where an image is taken by an imaging element as an optical detection element is an angle defined between a virtual line connecting the center of the imaging element and one node region, and a virtual line connecting the node region located on the opposite side and the center of the imaging element.

Therefore, in the case of FIG. 8 in which the resonant frequency ratio is about 1.0, the viewing angle is able to be widened as compared with the case of FIG. 9 in which the resonant frequency ratio is about 1.2.

Figure 10:
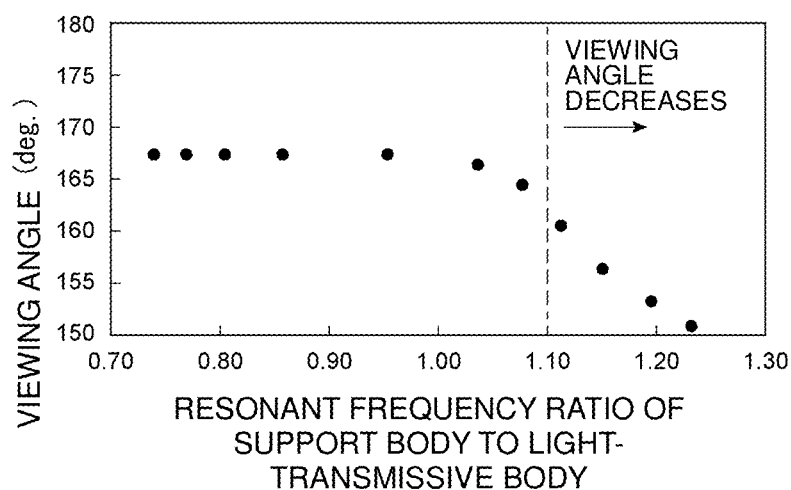
FIG. 10 is a diagram indicating a relationship between the resonant frequency ratio and a viewing angle.

FIG. 10 is a diagram indicating a change in viewing angle in a case where the above-described resonant frequency ratio is changed. As is apparent from FIG. 10, when the resonant frequency ratio exceeds about 1.1, the viewing angle decreases as the resonant frequency ratio increases. On the other hand, when the viewing angle is equal to or less than about 1.1, a large viewing angle of equal to or more than about 163° is able to be provided.

Figure 11:
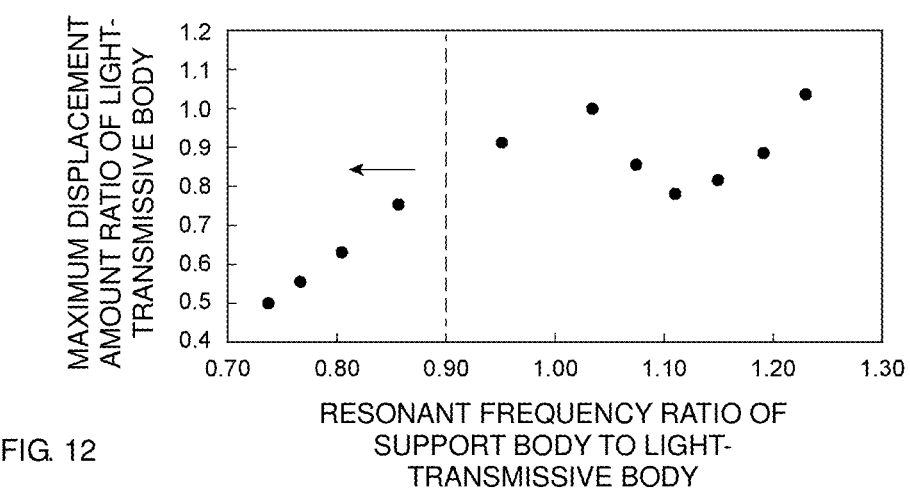
FIG. 11 is a diagram showing a relationship between the resonant frequency ratio and a maximum displacement amount ratio of a light-transmissive body.

In a case where the above-described resonant frequency ratio is changed, the displacement amount of the light-transmissive body 11 that removes water droplets or the like, for example, also changes. FIG. 11 is a diagram indicating a change in a maximum displacement amount ratio of the light-transmissive body 11 in a case where the above described resonant frequency ratio is changed. Here, the maximum displacement amount ratio of the light-transmissive body 11 refers to a ratio of the maximum displacement amount of the light-transmissive body 11 with respect to the maximum displacement amount of the light-transmissive body 11 in a case where the resonant frequency ratio is about 1. The maximum displacement amount is the displacement amount of the center because the center of the light-transmissive body 11 is displaced the most.

As is apparent from FIG. 11, when the resonant frequency ratio is less than about 0.9, the maximum displacement amount ratio of the light-transmissive body becomes smaller as the resonant frequency ratio becomes smaller. Therefore, in order to provide a larger displacement amount, the resonant frequency ratio is preferably equal to or more than about 0.9, for example. Accordingly, the above-described resonant frequency ratio is preferably equal to or more than about 0.9 and equal to or less than about 1.1, for example.

Figure 12:
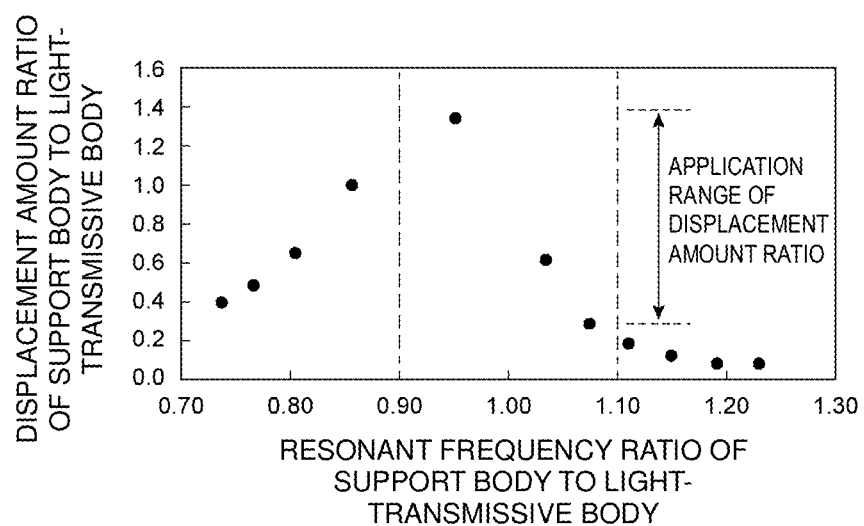
FIG. 12 is a diagram showing a relationship between the resonant frequency ratio and a displacement amount ratio of the support body to the light-transmissive body at a connection portion.

FIG. 12 indicates the above-described resonant frequency ratio and a change in the displacement amount ratio between the support body 12 and the light-transmissive body 11 at the connection portion. As is apparent from FIG. 12, in a range in which the resonant frequency ratio is equal to or more than about 0.9 and equal to or less than about 1.1, the displacement amount ratio in the connection portion between the support body 12 and the light-transmissive body 11 is equal to or more than about 0.3 and equal to or less than about 1.38.

As described above, the resonant frequency ratio is preferably equal to or more than about 0.9 and equal to or less than about 1.1, for example. In other words, it is sufficient that the resonant frequency of the support body 12 may preferably be within the resonant frequency about ±10% of the light-transmissive body 11, and this range is the same or substantially the same frequency range as the resonant frequency of the light-transmissive body 11 as described above.

Figure 13:
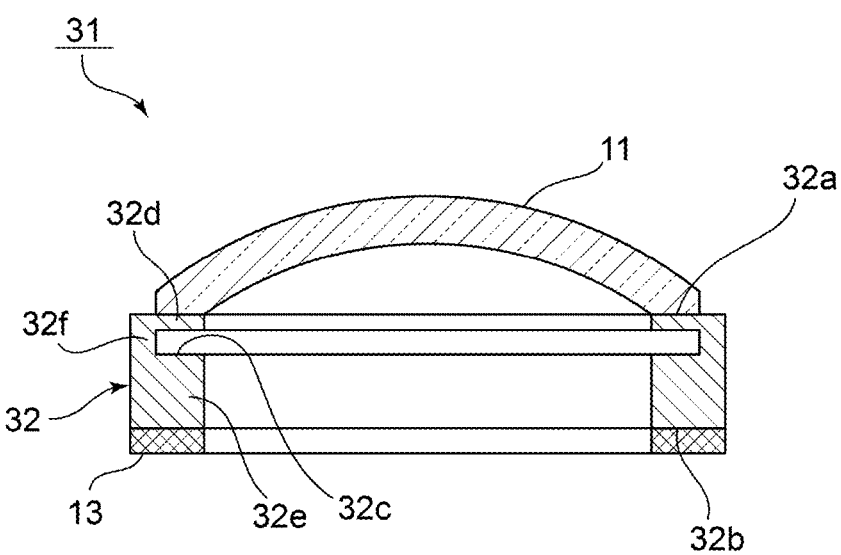
FIG. 13 is a front cross-sectional view for explaining a vibration device according to a second preferred embodiment of the present invention.

FIG. 13 is a front cross-sectional view of a vibration device according to a second preferred embodiment of the present invention. In a vibration device 31, a tubular support body 32 is different from the tubular support body 12 in the first preferred embodiment. The other points in the vibration device 31 of the second preferred embodiment are the same as or similar to those of the vibration device 3 of the first preferred embodiment. Accordingly, the description of the portions other than the support body 32 will be described with reference to the first preferred embodiment.

The tubular support body 32 is connected to the light-transmissive body 11 on a side of a first end surface 32a. The vibrating body 13 including a ring-shaped piezoelectric element is fixed to a second end surface 32b.

The support body 32 includes a groove 32c on its inner peripheral surface. The groove 32c is provided between the first end surface 32a and the second end surface 32b. Since the groove 32c is provided, a first inward projecting portion 32d is provided on an upper side of the groove 32c, and a second inward projecting portion 32e is provided on a lower side of the groove 32c. An outer portion of the groove 32c is a coupling portion 32f, and couples the first inward projecting portion 32d and the second inward projecting portion 32e. Therefore, in a cross section extending from the support body 32 toward the light-transmissive body 11, the support body 32 preferably has a U-shape. Note that since the first inward projecting portion 32d and the second inward projecting portion 32e project inwardly in an annular shape from the coupling portion 32f as a reference, in this specification, such a portion projecting inward in a radial direction is also referred to as a flange portion. That is, the first inward projecting portion 32d and the second inward projecting portion 32e are first and second flange portions projecting inward in the radial direction, respectively.

In a case where the first flange portion and the second flange portion are opposed to each other as described above, the first inward projecting portion 32d side is vibrated more strongly, and thus the light-transmissive body 11 is able to be vibrated more strongly. Preferably, as shown in FIG. 13, there are no other members in the groove 32c, and the first inward projecting portion 32d and the second inward projecting portion 32e are separated from each other with a space therebetween, for example. Accordingly, the first inward projecting portion 32d is able to be vibrated more strongly. A dimension connecting an inner peripheral edge and an outer peripheral edge of the first inward projecting portion 32d may preferably be the same or substantially the same as a dimension connecting an inner peripheral edge and an outer peripheral edge of the second inward projecting portion 32e, for example. In the direction from the support body 32 toward the light-transmissive body 11, a distance between the first inward projecting portion 32d and the second inward projecting portion 32e is preferably smaller than the dimension connecting the inner peripheral edge and the outer peripheral edge of the first inward projecting portion 32d, for example. Note that as described above, the cancellation portion is a portion where the support body is displaced in the displacement direction of the light-transmissive body 11 and a portion where the support body is displaced in the opposite or substantially opposite direction to the displacement direction of the light-transmissive body 11 are adjacent to each other. In the second preferred embodiment, the cancellation portion includes the first inward projecting portion 32d as the first flange portion and the second inward projecting portion 32e as the second flange portion. In the cancellation portion, the first flange portion and the second flange portion are opposed to each other.

Figure 14:
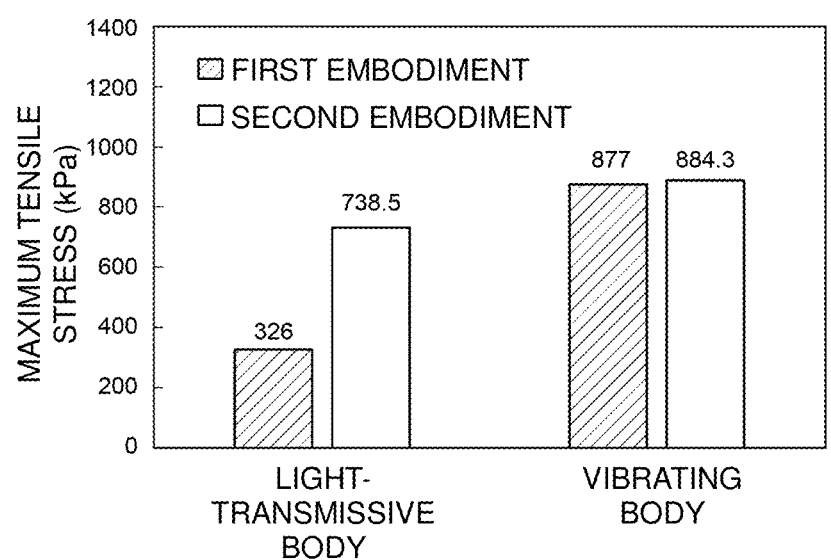
FIG. 14 is a diagram showing a maximum tensile stress of a dome-shaped cover and a vibrating body in the first preferred embodiment and the second preferred embodiment of the present invention.
Figure 15:
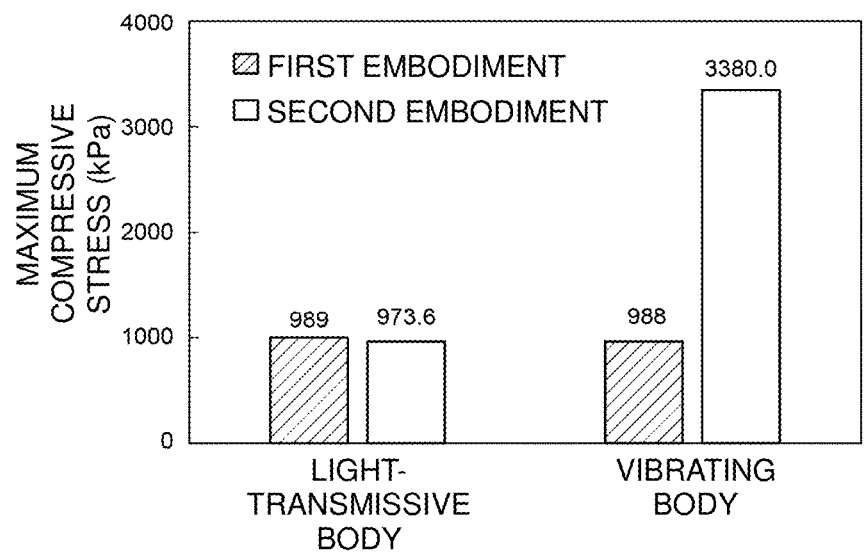
FIG. 15 is a diagram showing a maximum compressive stress of the dome-shaped cover and the vibrating body in the first preferred embodiment and the second preferred embodiment of the present invention.

FIG. 14 indicates a maximum tensile stress in the light-transmissive body 11 and the vibrating body 13 in a case where the vibration device 3 of the first preferred embodiment and the vibration device 31 of the second preferred embodiment are vibrated, and FIG. 15 indicates a maximum compressive stress. As is apparent from FIG. 14 and FIG. 15, according to the first preferred embodiment, the maximum tensile stress in the light-transmissive body 11 is able to be significantly reduced, and the maximum compressive stress in the vibrating body 13 is able to be significantly reduced, as compared with the second preferred embodiment.

Further, in the second preferred embodiment, since the cross section of the support body 32 is U-shaped and the groove 32c is provided inside, the vibrating body 13 is able to be provided inside in the radial direction as compared with the first preferred embodiment. That is, an outer diameter of the support body 32 is able to be significantly reduced, and thus, the size of the support body is able to be significantly reduced. In an example in which the support body 32 provides a resonant frequency of about 50 kHz, a volume of the support body 32 is able to be significantly reduced by about 50% compared with the first preferred embodiment.

Also in the vibration device 31 of the second preferred embodiment, the resonant frequency of the above-described support body 32 is preferably the same or substantially the same as the resonant frequency of the light-transmissive body 11, for example. Then, by driving the vibrating body 13 by a drive circuit with a resonant frequency the same or substantially the same as the above-described resonant frequency, in the connection portion, the light-transmissive body 11 and the support body 32 are able to be vibrated in a vibration mode in which displacement of a portion on the connection portion side of the light-transmissive body 11 and displacement of a portion on the connection portion side of the support body 32 are in opposite or substantially opposite directions. Therefore, similarly to the first preferred embodiment, a node of the vibration is not present in the portion located within the field of view of the light-transmissive body 11. Therefore, water droplets, dust, or the like, for example, adhering to the outer surface of the light-transmissive body 11 are able to be reliably removed.

Figure 16:
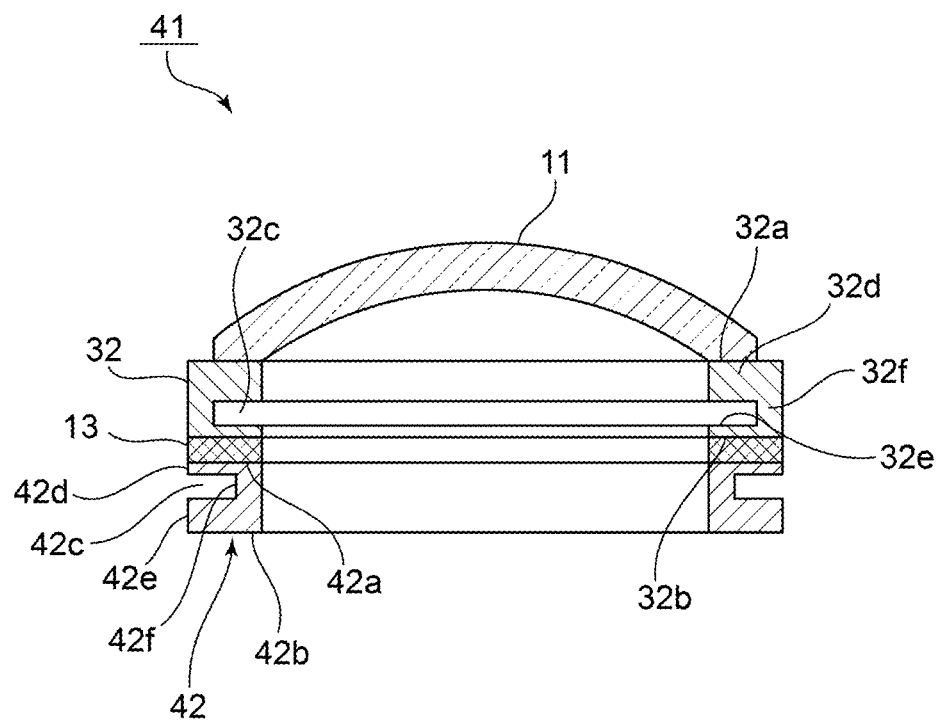
FIG. 16 is a front cross-sectional view of a vibration device according to a third preferred embodiment of the present invention.
Figure 17:
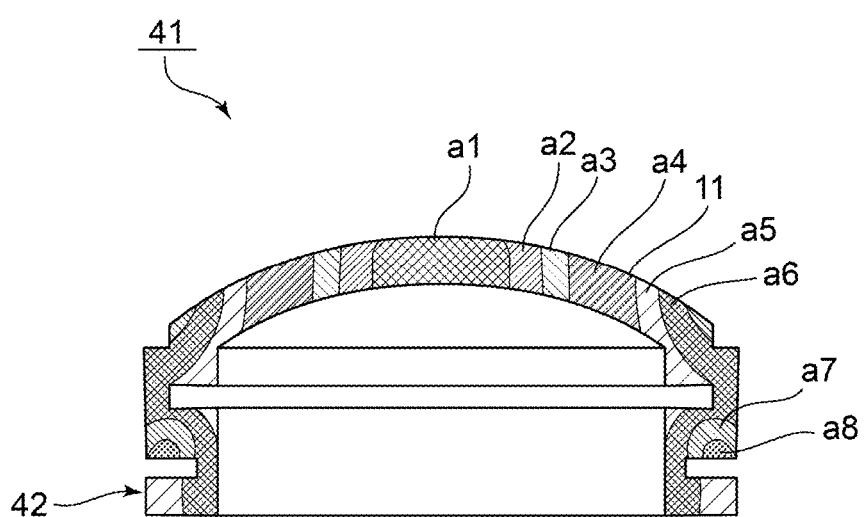
FIG. 17 is a cross-sectional view showing displacement distribution of the vibration device according to the third preferred embodiment of the present invention.

FIG. 16 is a front cross-sectional view of a vibration device of a third preferred embodiment of the present invention, and FIG. 17 is a cross-sectional view showing displacement distribution thereof.

The vibration device 41 of the third preferred embodiment has a structure in which a support body 42 is further joined to a lower surface of the vibrating body 13 of the vibration device 31 of the second preferred embodiment. The support body 42 includes a tubular body, and includes a first end surface 42a and a second end surface 42b as an open end surface. The ring-shaped first end surface 42a is joined to the vibrating body 13. In the support body 42, a groove 42c is provided on an outer peripheral surface, in the opposite case of the support body 32. Accordingly, a first flange portion 42d is provided above the groove 42c, a second flange portion 42e is provided below the groove 42c, and a bottom portion of the groove 42c becomes a coupling portion 42f coupling the first flange portion 42d and the second flange portion 42e. As shown in FIG. 16, the first flange portion in the support body 32 and the second flange portion 42e in the support body 42 project in opposite or substantially opposite directions to the respective coupling portions. The first flange portion 42d in the support body 42 and the second flange portion in the support body 32 also project in opposite or substantially opposite directions to the respective coupling portions.

Accordingly, when the support body 32 is provided as a first support body, the second support body 42 may be further joined under the vibrating body 13 including the piezoelectric element. Also in the third preferred embodiment, a resonant frequency relationship between the support body 32 and the light-transmissive body 11 and the frequency that drives the vibrating body 13 by the drive circuit are the same as or similar to those in the first and second preferred embodiments. Therefore, water droplets, dust, or the like, for example, adhering to the outer surface of the light-transmissive body 11 are able to be reliably removed.

In addition, in the vibration device 41, when the vibrating body 13 is vibrated, the first support body 32 and the second support body 42 are displaced in the opposite or substantially opposite directions. Therefore, the displacement in the opposite or substantially opposite directions to each other in the vibrating body 13 including piezoelectric elements are canceled out, so that deformation of the vibrating body 13 is able to be significantly reduced as shown in FIG. 17. In the vibration device 41 of the third preferred embodiment, it has been confirmed that the maximum displacement amount in the piezoelectric element is significantly reduced to about 0.75 times as compared with the vibration device 31 of the second preferred embodiment. Therefore, the stress applied to the piezoelectric element is significantly reduced, so that breakage or deterioration of the piezoelectric element at the time of repeated use is less likely to occur. Therefore, the reliability is able to be improved.

Figure 18:
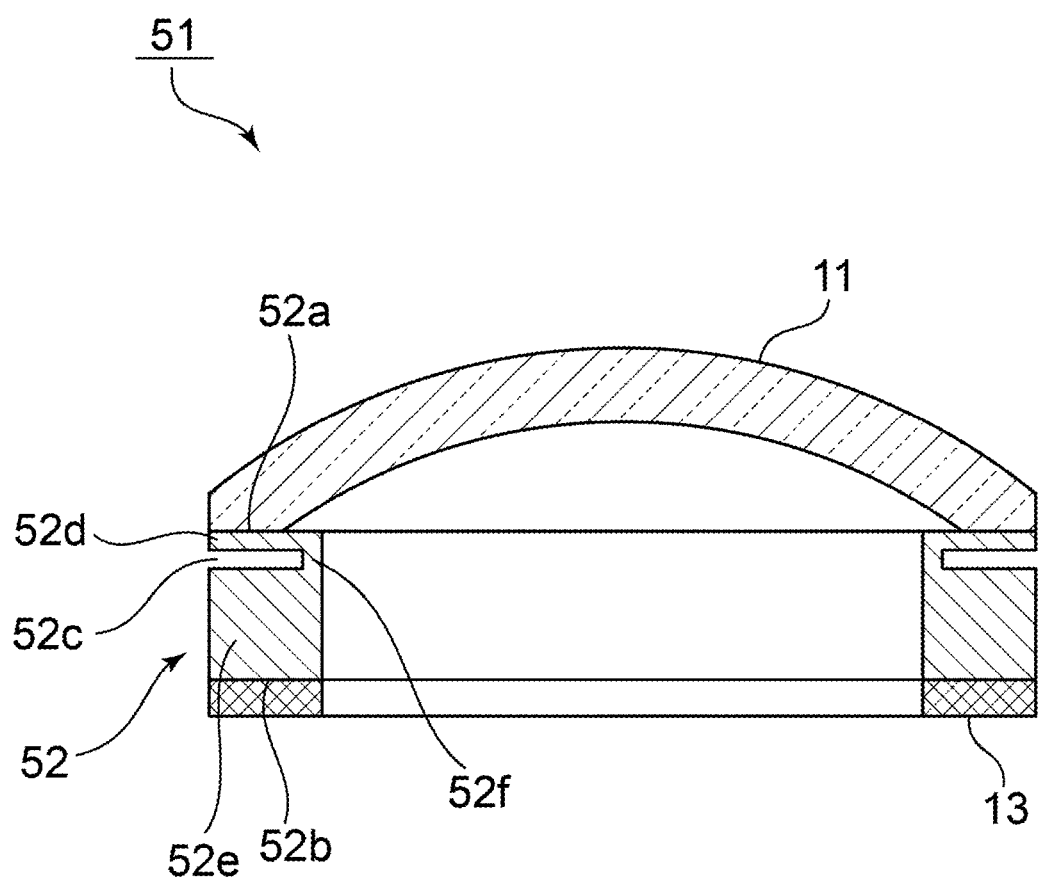
FIG. 18 is a front cross-sectional view of a vibration device according to a fourth preferred embodiment of the present invention.

FIG. 18 is a front cross-sectional view of a vibration device according to a fourth preferred embodiment of the present invention.

In a vibration device 51, a groove 52c is provided on an outer peripheral surface of a support body 52. That is, the support body 52 has a structure similar to that of the second support body 42 in the third preferred embodiment.

A portion between the groove 52c and a first end surface 52a is a first flange portion 52d. A portion between the groove 52c and a second end surface 52b is a second flange portion 52e. The first flange portion 52d and the second flange portion 52e are coupled to each other by a coupling portion 52f located at a bottom portion of the groove 52c. That is, when the coupling portion 52f is used as a reference, the first flange portion 52d and the second flange portion 52e define a flange portion projecting outward in the radial direction.

Accordingly, a cross-sectional shape of the support body 52 including a tubular body may preferably have a U-shape that is open toward the outside, contrary to the vibration device 31 of the second preferred embodiment.

Figure 19:
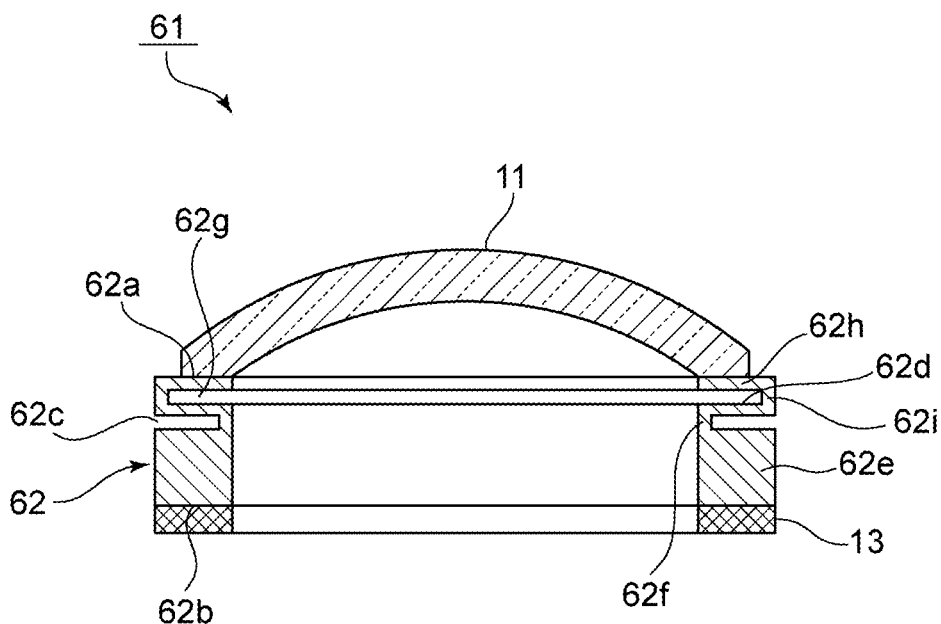
FIG. 19 is a front cross-sectional view of a vibration device according to a fifth preferred embodiment of the present invention.

FIG. 19 is a front cross-sectional view of a vibration device according to a fifth preferred embodiment of the present invention. In a vibration device 61, a support body 62 including a tubular body includes a groove 62c opened toward an outside on an inner peripheral surface and a groove 62g opened toward an inner side on the inner peripheral surface. A first end surface 62a, which is a first ring-shaped opening end surface, is joined to the light-transmissive body 11. The groove 62g is located between the first end surface 62a and the groove 62c. Therefore, a first flange portion 62d above the groove 62c and a second flange portion 62e on the lower side are coupled by a coupling portion 62f. The vibrating body 13 is joined to a second end surface 62b which is a lower surface of the second flange portion 62e. That is, based on the outer surface of the coupling portion 62f at a bottom portion of the groove 62c, the first and second flange portions 62d and 62e are annular flange portions projecting outward in the radial direction.

On the other hand, a flange portion 62h above the groove 62g is coupled to the first flange portion 62d by a coupling portion 62i. Therefore, in a case where the groove 62g is centered, when the flange portion 62h is defined as the first flange portion, the first flange portion 62d defines and functions as the second flange portion. In such a structure, the flange portion 62h projecting inward in the radial direction and the first and second flange portions 62d and 62e projecting outward in the radial direction are provided. When the flange portion 62h is defined as the first flange portion and the first flange portion 62d is defined as the second flange portion as described above, as shown in FIG. 19, the first flange portion and the second flange portion are project in the opposite or substantially opposite direction to the coupling portion. Therefore, the support body 62 has an S-shape in a cross section orthogonal or substantially orthogonal to a circumferential direction of the support body 62, that is, in a cross section including a direction from the support body 62 toward the light-transmissive body 11. As shown in FIG. 19, the first flange portion 62d is opposed to the flange portion 62h and the second flange portion 62e with a space therebetween. Even in this case, when the support body 62 is vibrated by the vibrating body 13, the light-transmissive body 11 is able to be vibrated more strongly. Note that the support body 62 in the fifth preferred embodiment includes a cancellation portion including the flange portion 62h and the first flange portion 62d, and a cancellation portion including the first flange portion 62d and the second flange portion 62e. However, deformation is significantly reduced or prevented in the first flange portion 62d, similar to the vibrating body 13 of the third preferred embodiment.

Figure 20:
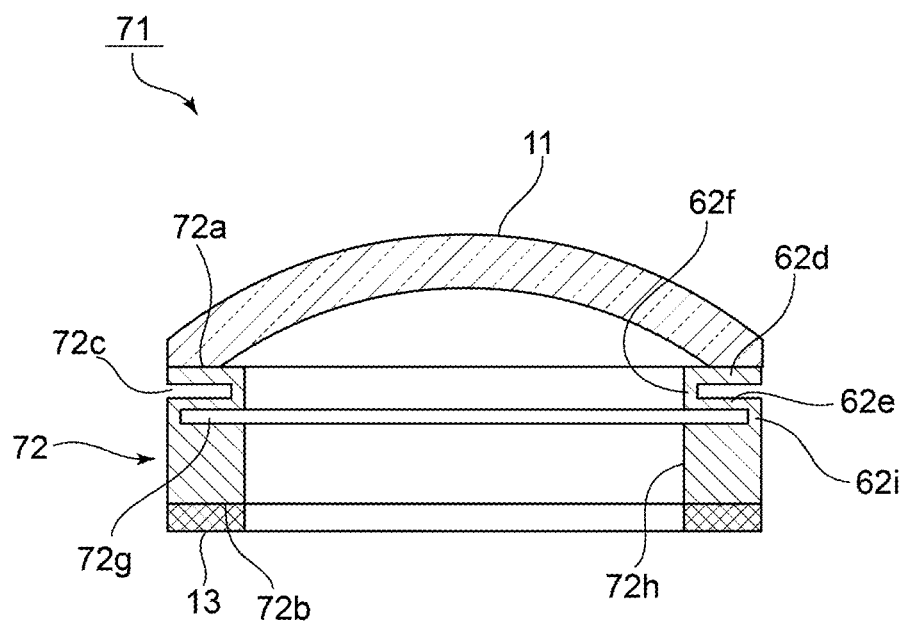
FIG. 20 is a front cross-sectional view of a vibration device according to a sixth preferred embodiment of the present invention.

FIG. 20 is a front cross-sectional view of a vibration device of a sixth preferred embodiment of the present invention. In a vibration device 71, a support body 72 includes a groove 72c opened toward the outside on the side closer to a first end surface 72a in contrast to the support body 62 shown in FIG. 19, and includes a groove 72g opened toward the inside on the side closer to a second end surface 72b than the groove 72c. Accordingly, a first flange portion 62d, the coupling portion 62f, the second flange portion 62e, the coupling portion 62i, and a flange portion 72h projecting toward the inside are coupled in this order from the first end surface 72a side. Therefore, the cross section of the support body 72 has an inverted S-shape, in other words, in a Z-shape. As shown in FIG. 20, the second flange portion 62e is opposed to the flange portion 72h and the first flange portion 62d with a space interposed therebetween. Even in this case, similar to the vibration device 61, when the vibrating body 13 is vibrated, the light-transmissive body 11 is able to be strongly vibrated.

Also in the vibration devices 61 and 71, similarly to the vibration device 3, the resonant frequency of the support body 62 or the support body 72 is the same or substantially the same as the resonant frequency of the light-transmissive body 11 and the vibrating body 13 is driven at the same or substantially the same frequency as the above-described resonant frequency. In the connection portion, it is possible to vibrate the light transmissive body 11 and the support body 62 or the support body 72 in a vibration mode in which displacement of a portion on the connection portion side of the light-transmissive body 11 and displacement of a portion on the connection portion side of the support body 62 or the support body 72 are in opposite or substantially opposite directions. Accordingly, since a small displacement portion or a node region is not present in the light-transmissive body 11 and is located at the connection portion between the two, water droplets, dust, or the like, for example, adhering to the outer surface of the light-transmissive body 11 are able to be reliably removed.

Note that in each of the preferred embodiments which has been described above, the support body 12 is cylindrical, but may also be a tubular body having other shapes, for example, a rectangular cylindrical shape or a substantially rectangular cylindrical shape.

The vibrating body 13 is not limited to a ring-shaped piezoelectric element, and piezoelectric vibrators having various shapes, for example, a plurality of square plate-shaped piezoelectric elements and other vibrating body may also be included.

In FIG. 2, the camera module main body 2 includes the imaging element 5 and the lens module 6, but the structure of the camera module main body 2 is not limited to that shown in FIG. 2. It is sufficient that the camera module main body may include at least an imaging element.

In the above preferred embodiments, the imaging element 5 which takes images with visible light is provided as the optical detection element, and the detection region is the field of view, but an active energy ray other than visible light may be used.

Therefore, the optical detection device of preferred embodiments of the present invention is not limited to the camera, and the preferred embodiments of the present invention may be applied to an in-vehicle radar apparatus known as RADAR or LiDAR, for example. In this case, an element that optically detects the active energy ray which is at least one of infrared rays and electromagnetic waves is included as the optical detection element.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A vibration device comprising:
    a dome-shaped cover including a detection region of an optical detection element;
    a tubular support body including an interior space in which the optical detection element is provided, the tubular support body being connected to the cover;
    a vibrating body coupled to the support body and vibrating the cover with the support body interposed between the vibrating body and the cover; and
    a drive circuit, in a case where the cover and the support body are vibrated at the same or substantially the same resonant frequency, in a connection portion where the cover and the support body are connected, driving the vibrating body at the same or substantially the same frequency as the resonant frequency to vibrate the cover and the support body in a vibration mode in which displacement of a portion on a connection portion side of the cover and displacement of a portion on a connection portion side of the support body are in opposite or substantially opposite directions.

2. The vibration device according to claim 1, wherein a displacement amount of the cover and a displacement amount of the support body are the same or substantially the same in the connection portion.

3. The vibration device according to claim 1, wherein in the connection portion, the support body includes a cancellation portion where a portion displaced in a displacement direction of the cover and a portion displaced in the direction opposite or substantially opposite to a displacement direction of the cover are adjacent to each other.

4. The vibration device according to claim 3, wherein the cancellation portion includes a first flange portion and a second flange portion extending in a direction orthogonal or substantially orthogonal to a direction from the support body toward the cover.

5. The vibration device according to claim 4, wherein at the cancellation portion, the first flange portion and the second flange portion are opposed to each other.

6. The vibration device according to claim 5, wherein at a portion where the first flange portion and the second flange portion are opposed to each other, the first flange portion is opposed to the second flange portion with a space interposed between the first flange portion and the second flange portion.

7. The vibration device according to claim 6, wherein the first flange portion and the second flange portion project from an inner peripheral surface of the support body toward the interior space side.

8. The vibration device according to claim 5, wherein
a coupling portion coupling an inner peripheral edge or an outer peripheral edge of the first flange portion to an inner peripheral edge or an outer peripheral edge of the second flange portion is provided; and
a U-shape is defined in a cross section where the first flange portion, the coupling portion, and the second flange portion are coupled along a direction in which the first and second flange portions are opposed to each other.

9. The vibration device according to claim 4, wherein the first flange portion and the second flange portion project in an opposite or substantially opposite direction to the coupling portion.

10. The vibration device according to claim 9, wherein the vibration device includes a coupling portion which connects the first flange portion and the second flange portion and extends in a direction from the support body toward the cover.

11. The vibration device according to claim 9, wherein another flange portion other than the first flange portion and the second flange portion is provided;
a coupling portion connecting an inner peripheral edge of the first flange portion to an inner peripheral edge of the second flange portion is provided; and
another coupling portion which is different from the coupling portion, and connects an outer peripheral edge of the other flange portion and an outer peripheral edge of the first flange portion, or another coupling portion connecting an outer peripheral edge of the second flange portion and an outer peripheral edge of the other flange portion is provided.

12. The vibration device according to claim 11, wherein the first flange portion or the second flange portion is opposed to the other flange portion with a space between the first flange portion or the second flange portion and the other flange portion.

13. The vibration device according to claim 12, wherein a cross section in a direction orthogonal or substantially orthogonal to a circumferential direction of the first flange portion and the second flange portion in a structure in which the first flange portion, the coupling portion, and the second flange portion are coupled to each other has an S-shape or a Z-shape.

14. The vibration device according to claim 4, wherein a dimension connecting an inner peripheral edge and an outer peripheral edge of the first flange portion and a dimension connecting an inner peripheral edge and an outer peripheral edge of the second flange portion are equal or substantially equal.

15. The vibration device according to claim 14, wherein a distance between the first flange portion and the second flange portion in a direction from the support body to the cover is smaller than a dimension connecting between the inner peripheral edge and the outer peripheral edge of the first flange portion.

16. The vibration device according to claim 1, wherein, in a detection region of the optical detection element, there is no region having displacement smaller than a displacement amount of the connection portion.

17. The vibration device according to claim 1, wherein the vibrating body is a piezoelectric element.

18. The vibration device according to claim 17, wherein the piezoelectric element is a ring-shaped piezoelectric element, and is fixed to an end surface opposite to a side on which the cover of the support body is provided.

19. The vibration device according to claim 1, wherein the cover includes a light-transmissive body.

20. An optical detection device comprising:
the vibration device according to claim 1; and
an optical detection element provided in at least a portion of an interior space of the support body of the vibration device and including the detection region in the cover.

21. The optical detection device according to claim 20, wherein the optical detection element is an imaging element, and the detection region is a field of view.

22. The optical detection device according to claim 20, wherein the optical detection element is an element that optically detects an active energy ray.

23. The optical detection device according to claim 22, wherein the active energy ray is at least one of an infrared ray and an electromagnetic wave.

24. A vibration device comprising:
a dome-shaped cover including a detection region of an optical detection element;
a tubular support body including an interior space in which the optical detection element is provided, the tubular support body being connected to the cover;
a vibrating body coupled to the support body and vibrating the cover with the support body provided between the vibrating body and the cover; and
a drive circuit, in a case where the cover and the support body are vibrated at the same or substantially the same resonant frequency, driving the vibrating body at the same or substantially the same frequency as the resonant frequency of the support body and the cover, and a node region is located at a connection portion where the cover and the support body are connected to each other.

25. The vibration device according to claim 24, wherein, in a case where the cover and the support body are vibrated at the same or substantially the same resonant frequency, in a connection portion where the cover and the support body are connected to each other, the drive circuit drives the vibrating body to vibrate the cover and the support body in a vibration mode in which displacement of a portion on a connection portion side of the cover and displacement of a portion on a connection portion side of the support body are in opposite or substantially opposite directions.

26. The vibration device according to claim 24, wherein displacement on one side of the node region and displacement on an opposite side of the node region are in opposite or substantially opposite directions and define a cancellation portion.

\* \* \* \* \*